No. 869,260.
PATENTED OCT. 29, 1907.
H. H. PORTER, Jr.
VEHICLE BODY.
APPLICATION FILED FEB. 14, 1905.
2 SHEETS—SHEET 1.
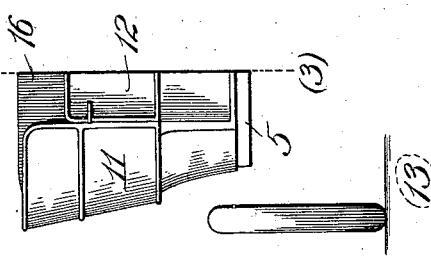
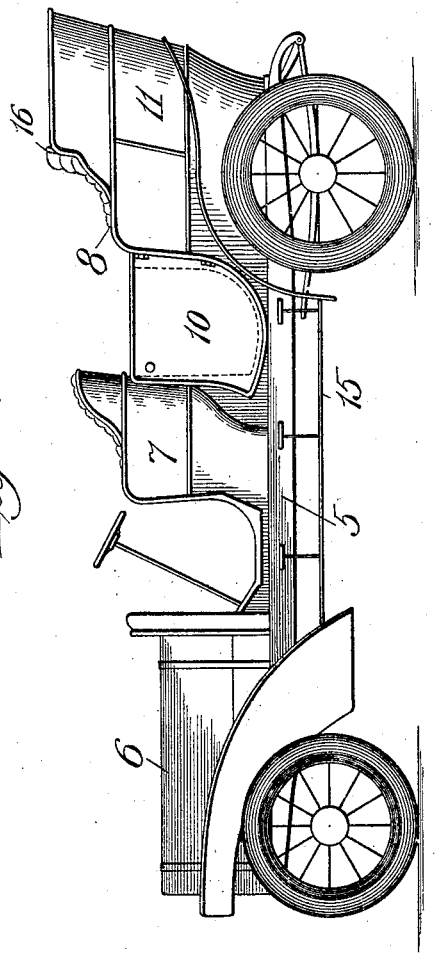
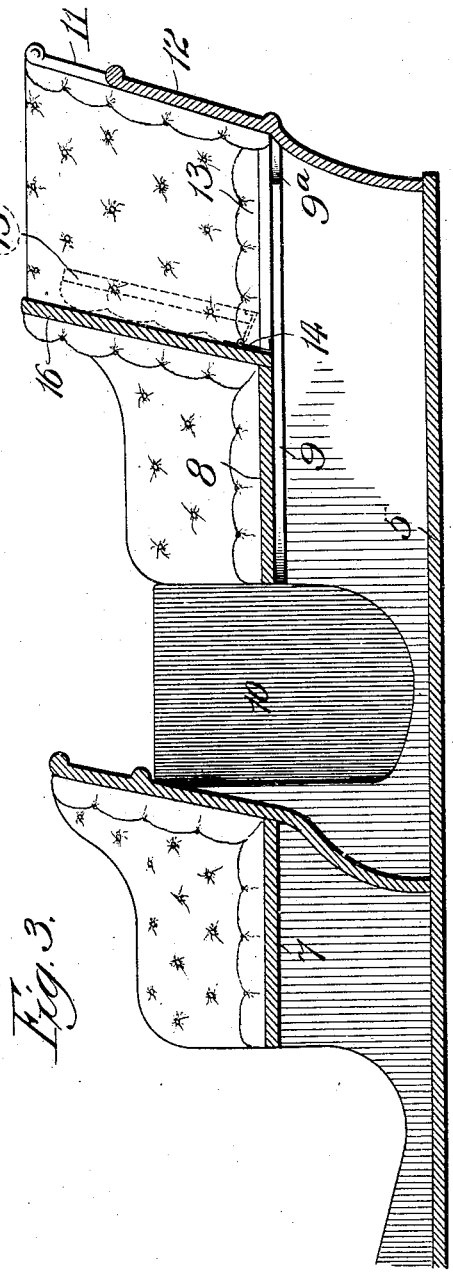
Witnesses:
F. W. H. Clay
Archworth Martin
Inventor:
Henry H. Porter Jr.
By Atty.
Paul Synnestvedt

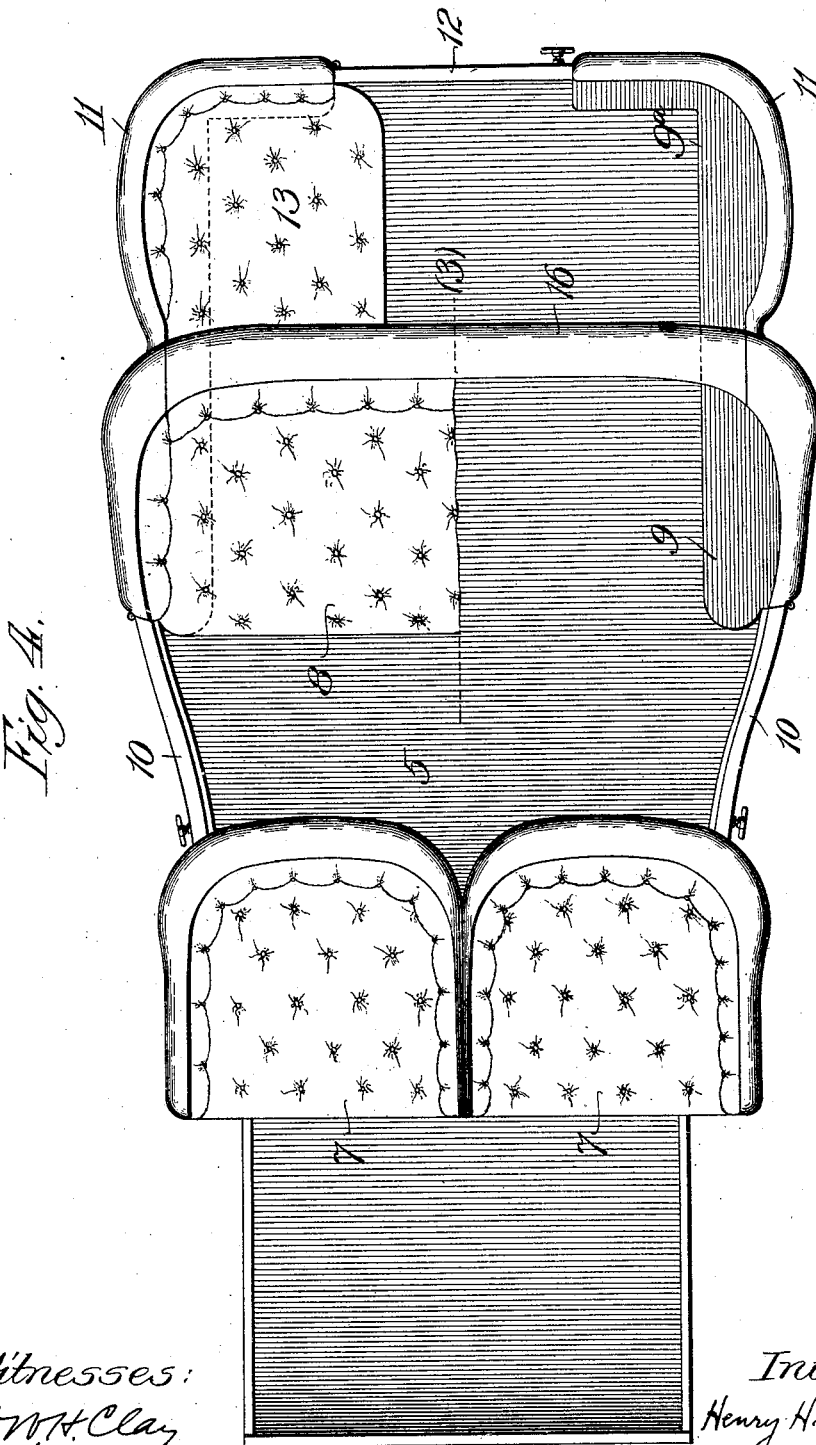

UNITED STATES PATENT OFFICE.

HENRY H. PORTER, JR., OF CHICAGO, ILLINOIS.

VEHICLE-BODY.

No. 869,260.  Specification of Letters Patent.  Patented Oct. 29, 1907.

Application filed February 14, 1905. Serial No. 245,561.

*To all whom it may concern:*

Be it known that I, HENRY H. PORTER, Jr., a citizen of the United States, residing at Chicago, in the State of Illinois, have invented certain new and useful Improvements in Vehicle-Bodies, of which the following is a specification.

My invention relates to passenger carrying vehicles, and especially to the bodies of automobile carriages. The objects of the invention are, to improve the designs and position of the seats, and provide for some elasticity in the arrangement of the seats; to provide a body in which some of the seats may conveniently be removed, and others shifted in position; to provide for easy access to the seats and for convenient storage of the baggage when desired, and to generally improve the structure and arrangements of the seats in vehicle bodies. For these purposes I make the construction which is illustrated as applied to an automobile in the accompanying drawings, wherein—

Figure 1 is a side elevation of the vehicle in diagram, and Figure 2 is a half rear elevation of the same;

Figure 3 is a central longitudinal section of the body with the hood removed, the section being on line (3) of Figure 2, and Figure 4 is a plan view of the body.

While the invention is of general application to vehicles, I have shown herein an automobile body designed to carry seven passengers when full. On the base 5 the usual hood 6 is placed in front, and back of this are the two seats 7 which may be of any ordinary construction. Behind the front seat is a compartment which may be wider containing a seat 8 sufficient for three persons, and access thereto is gained through the side-opening doors 10, the step 15 being long enough to accommodate both this door and the open side for access to the front seat 7.

Back of the central compartment is another compartment of about the same width, as shown in Figure 4, which is completely inclosed by the side frame 11 and the rearwardly opening door 12. In this compartment are preferably two single seats 13 placed at the sides and leaving an open space between them. They rest upon a shelf 9ª, which is a continuation of the shelf 9 upon which the middle seat rests. The seats 13 are attached to the back 16 of the middle seat by hinges 14, and may be folded up as shown in Figure 3. When so folded the middle seat 8 and its back 16 may be slid back bodily from the position shown in Figure 4, until it occupies the rear compartment, thus leaving the central compartment much enlarged for any purpose desired.

It will be seen that the rear compartment, which is designed ordinarily for the chauffeur and the baggage, may be adjusted to any desired dimension, and while of ready access takes up very little room, and may be entirely cut off from the other compartments. The seven seats are thus very compactly arranged, and the advantage of being able to shift the position of the seats; the easy access to all of them without disturbance of the others, and other advantages, will be readily apparent to those familiar with such vehicles.

Having thus described my invention and illustrated its use, what I claim as new and desire to secure by Letters Patent, is the following:

1. A vehicle body having a front seat, a compartment located behind said seat and an adjustable partition dividing the compartment into two sections, and provided with seats upon its oppositely disposed faces, substantially as described.

2. A vehicle body having two front seats, two removable rear seats, and a single wide seat in the middle, mounted to slide backward to take the place of the rear seats when removed.

3. In a vehicle body the combination with the closed central compartment having the seat therein, and the separate closed rear compartment having a rear door, and the removable single seats 13 therein.

4. A vehicle body having a central seating compartment, side doors for access to the same, and a rear compartment having a rear door for access thereto, and being open in the middle and having at the two sides the removable seats 13, substantially as described.

5. A vehicle body having a rear compartment, a shiftable central partition, two rear seats hinged to said partition, a middle seat attached to said partition and designed to slide backward to occupy the rear compartment, substantially as described.

6. In a vehicle body the combination with the supporting shelf 9, 9ª, of the shiftable seat 8, 16, resting thereon and having hinged thereto the rear seats 13, substantially as described.

7. A vehicle body having an open front seat, a closed central compartment with a single wide seat, and a closed rear compartment having a rear door and two seats therein hinged to the said central seat, substantially as and for the purpose described.

8. A vehicle body having an open front seat, a closed central compartment with a single wide seat, and a closed rear compartment having a rear door and two seats therein, substantially as described.

9. A vehicle body having an open front seat, a closed central compartment, and a closed rear compartment having a rear door, substantially as and for the purpose described.

10. A vehicle body having a front seat, a central seating compartment, side doors for access to the same, and a rear compartment having a rear door for access thereto, substantially as described.

11. A vehicle body having a central seating compartment, side doors for access to the same, and a rear compartment having a rear door for access thereto, substantially as described.

In testimony whereof I have hereunto signed my name in the presence of the two subscribed witnesses.

HENRY H. PORTER, JR.

Witnesses:
  PAUL CARPENTER,
  ALBERT GRANT MILLER.